Nov. 6, 1951     F. R. McFARLAND     2,573,919
TRANSMISSION
Filed March 8, 1946     2 SHEETS—SHEET 1
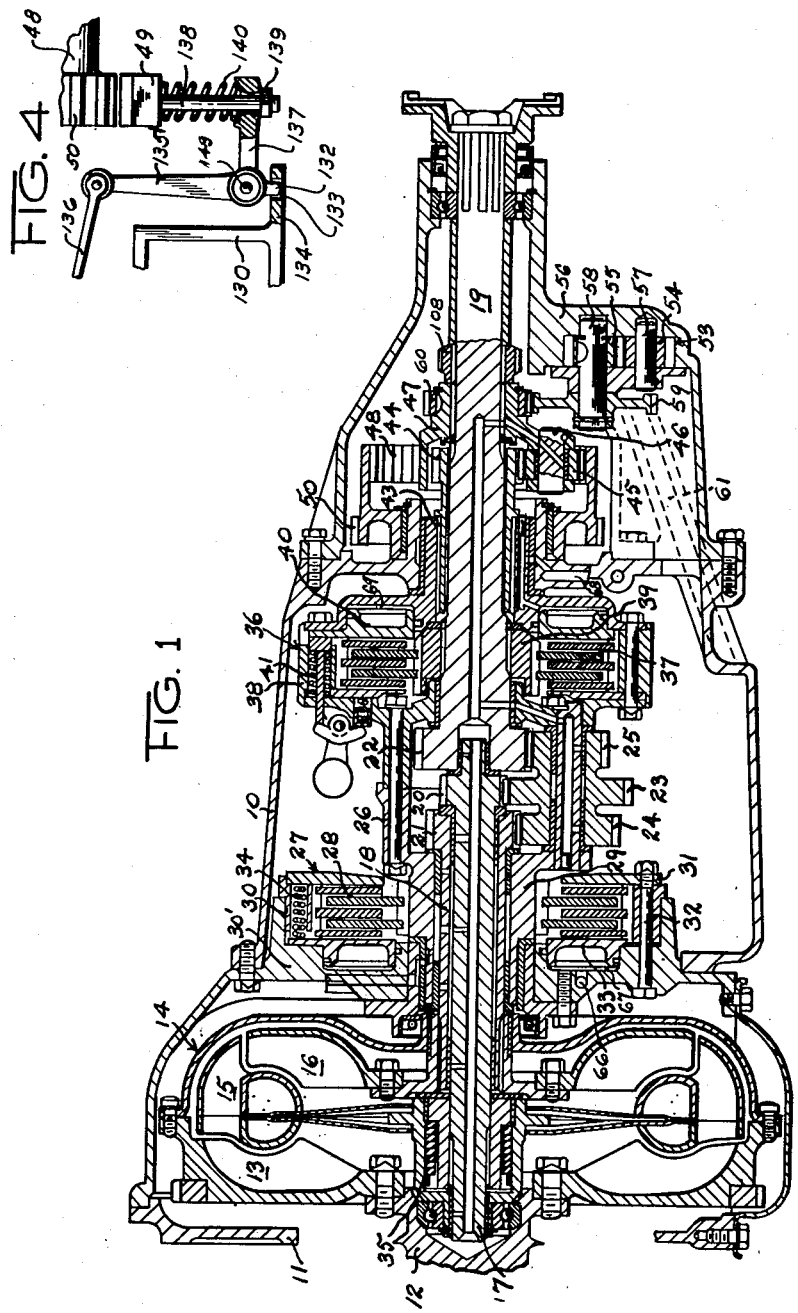
INVENTOR.
Forest R. McFarland
BY
Sibbetts & Hart
Attorneys Nov. 6, 1951     F. R. McFARLAND     2,573,919
TRANSMISSION
Filed March 8, 1946     2 SHEETS—SHEET 2
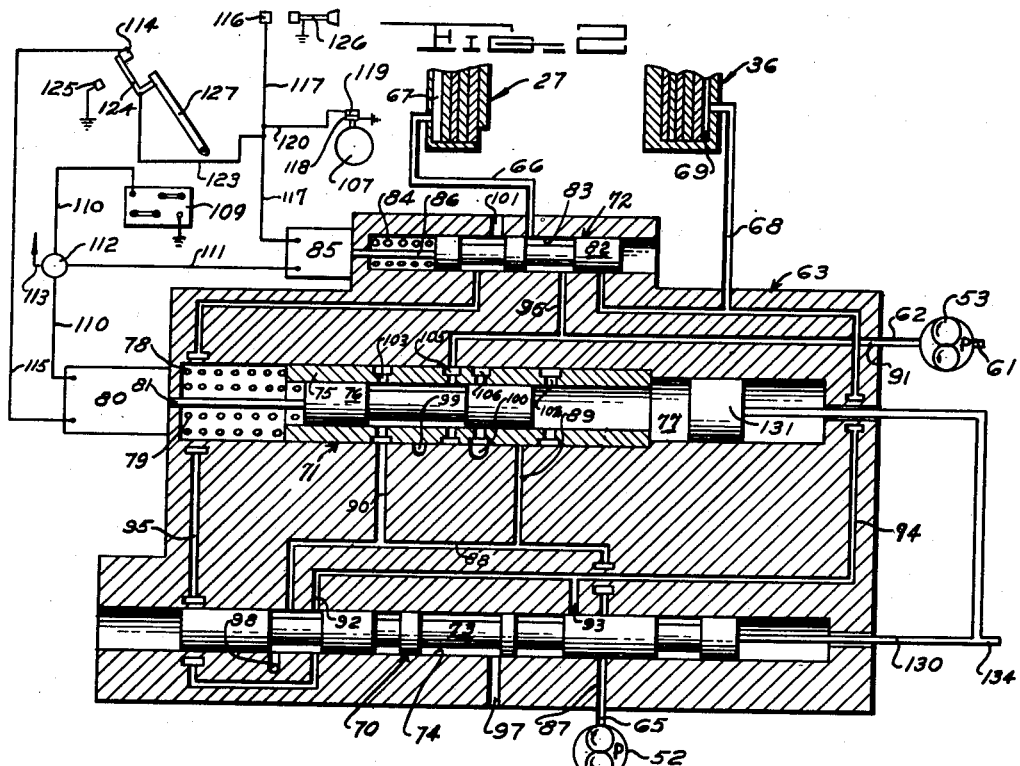
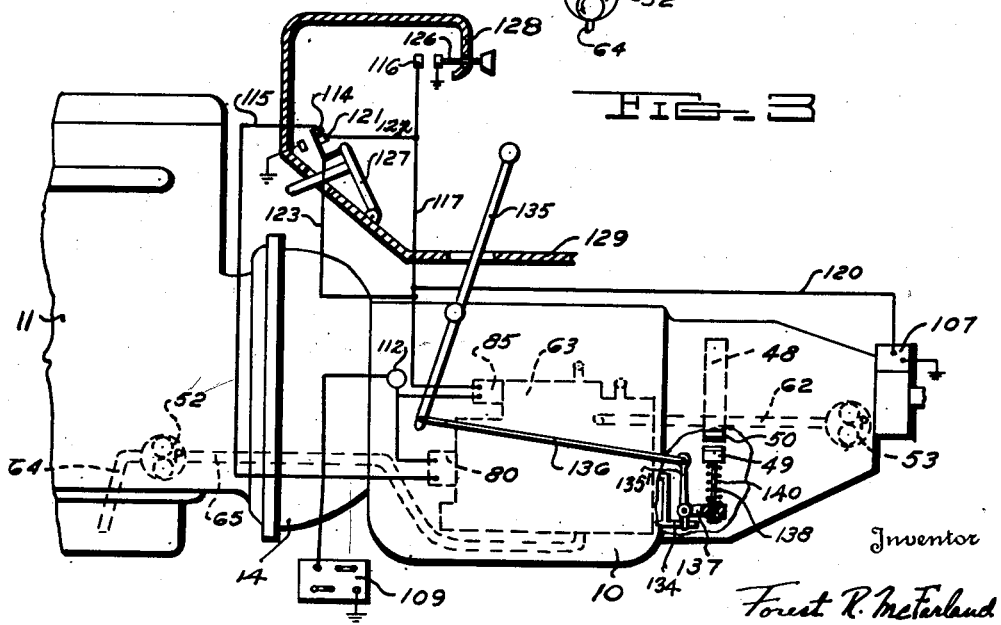
Inventor
Forest R. McFarland
By Sibbitts & Hart
Attorneys

Patented Nov. 6, 1951

2,573,919

UNITED STATES PATENT OFFICE 2,573,919

TRANSMISSION

Forest R. McFarland, Huntington Woods, Mich., assignor to Packard Motor Car Company, Detroit, Mich., a corporation of Michigan Application March 8, 1946, Serial No. 652,837

26 Claims. (Cl. 74—472)

This invention relates to transmissions and control means therefor.

An object of the invention is to provide a transmission for motor vehicles in which several forward speeds are selected automatically to obtain the best mechanical advantage for the driving conditions encountered.

Another object of the invention is to provide a transmission for motor vehicles in which automatic driving speed selection may be overruled by the driver.

Another object of the invention is to provide a transmission for motor vehicles in which selected drive may be established by a pressure fluid system under the joint control of electrically energized means and driver operated means.

Another object of the invention is to provide a transmission for motor vehicles in which forward or reverse drive may be initiated without interference or noise.

Another object of the invention is to provide transmission control means in which geared or direct drive is automatically obtained and geared drive may be obtained at the will of the driver.

Other objects of the invention will appear from the following description taken in connection with the drawings, which forms a part of this specification, and in which:

Fig. 1 is a sectional view of a motor vehicle transmission and control therefor incorporating the invention;

Fig. 2 is a diagrammatic view partly in section showing the transmission control means;

Fig. 3 is a side elevational view of the transmission showing the control means diagrammatically; and Fig. 4 is a view of the actuator for the valve control and the brake device for reverse drive.

The transmission is housed in casing 10 secured to one end of internal combustion engine 11. The engine crankshaft 12 is connected with the impeller 13 of a fluid coupling device 14 through which power is transmitted to runners 15 and 16 having concentric power or drive shafts 17 and 18. A driven shaft 19 aligns with the drive shafts and means is provided for driving the driven shaft from the driving shafts at two reduced speeds through two gear trains. This driving means is in the form of planetary gearing in which gears 20 and 21 are fixed respectively to driving shafts 17 and 18 and gear 22 is fixed to driven shaft 19. Plant gears 23, 24 and 25 mesh respectively with gears 20, 21 and 22 and are mounted on a reaction carrier 26. The planet gears are formed as a unitary structure or may be separate but fixed together as a unitary structure.

Drive through either one of the planetary gear trains at a speed less than that of their driving shafts is obtained by engagement of a brake device 27 having friction plates 28 alternately engageable with an extension 29 of the carrier 26 and a ring member 30 fixed in wall 30' of casing 10. Backing plate 31 and ring member 30 are fixed to the wall by bolts 32 and a spring 34 engages the backing plate and normally moves an actuator 33 for the brake device into disengaged position. Engagement of the brake device will prevent retrograde movement of the carrier whereupon drive is transmitted through the driving means from either one of the driving shafts to the driven shaft at a reduced speed. A one-way clutch 35 provides a driving connection for the low speed runner 15 and permits shaft 17 to overrun the vane portion of the runner 15 when the runner 16 is effective as the driver. At low engine speeds the first runner 15 will be the driver and as the speed of the engine increases the second runner 16 will take over the drive.

A clutch device 36 is associated with the driving means between the driving and driven shafts to effect unitary rotation of the driving means whereby the driven shaft 19 will be rotated at substantially the same speed as the driving shafts and the crankshaft except for some small amount of slip between the runners and the impeller. The clutch device consists of plates 37 alternately secured to an extension 38 of the carrier 26 and a ring member 39 splined to the driven shaft 19. Clutch actuator 40 is movable in the carrier extension 38 and is normally urged to disengaged position by springs 41. When the clutch device is engaged the carrier is locked to rotate in unison with the driven shaft 19 and consequently the planetary gearing or driving means between the driving and driven shafts is locked to rotate as a unitary structure.

The brake and clutch devices are arranged to be controlled by a pressure fluid system in which flow control valve devices are arranged and operated so that the driving means, that is the planetary gearing, can be conditioned for the various driving conditions encountered in the operation of a motor vehicle.

In forward drive it is necessary to engage either the clutch device or the brake device in order to establish the drive to shaft 19. In order to drive shaft 19 reversely the brake and clutch devices must be disengaged. The reverse drive mechanism includes extension 38 of the carrier that is splined at 43 to a sun gear 44 rotatably mounted around the driven shaft. Gears 45 mesh with the sun gear and are rotatably mounted on pins 46 fixed to carrier 47 that is splined to the driven shaft 19. There is also an annulus or reaction gear 48 mounted for free rotation during forward drive and held stationary for reverse drive. In order to establish the reverse drive there is provided a manually operable brake means for gear 48 in the form of a pawl 49 slidably mounted to engage external teeth 50 on gear 48. When the brake and clutch devices 27 and 36 are released from the driving means, carrier 26 will be driven in reverse direction through the planetary gearing and extension 38 will rotate sun gear 44 in a reverse direction. As gears 45 mesh with the pawl held reaction gear member 48, they will transmit reverse drive to carrier 47 and shaft 19 at a slower rate of speed than that at which carrier 26 is being driven. The controls for establishing forward and reverse drives will be described as the specification progresses.

The pressure fluid system for controlling the brake and clutch devices 27 and 36 includes pump 52 driven from the engine crankshaft by suitable gearing and pump 53 driven from the driven shaft. Pump 53 includes a pair of meshing members 54 and 55 located in a chamber in wall 56 of the casing 10 and fixed respectively to shafts 57 and 58. Shaft 58 has gear 59 fixed thereto that meshes with drive gear 60 splined on the planetary carrier 47. Pump 53 is connected with the bottom portion of casing 10 by inlet conduit 61 and has an outlet conduit 62 leading to a housing 63 for the valve devices. Pump 52 has an inlet conduit 64 leading from the crankcase of the engine and an outlet conduit 65 leading to housing 63. Conduit 66 connects the control housing with chamber 67 in which the brake device actuator 33 operates and conduit 68 connects the control housing with chamber 69 in which the clutch device actuator 40 operates.

There are three valve devices 70, 71 and 72 in housing 63 arranged in series for controlling fluid flow to the brake and clutch devices 27 and 36. Valve device 70 has a multiple flanged valve member 73 axially slidable in chamber 74 in the housing 63 and is operated by the vehicle driver through mechanism for dictating neutral, forward or reverse drive through the transmission.

Valve device 71 is a compound structure consisting of two telescoped and relatively movable valve members 75 and 76 that are movable relatively axially in chamber 77 in housing 63. Valve member 75 is urged into one open position by spring 78 and is moved into another open position by driver operated mechanism which is the same as that for actuating valve member 73. Valve member 76 is urged into open position by spring 79 and is moved into closed position by electrically energized means including a solenoid 80, the valve member having a stem 81 that is shifted by the solenoid.

Valve device 72 has a valve member 82 axially shiftable in chamber 83 in housing 63. This valve member is urged into one position by spring 84 and into another position by electrically energized means including solenoid 85, the valve member having a stem 86 that is shifted by the solenoid.

The valve member chambers in housing 63 are connected with each other and the pumps by various passages and are vented by various passages. Pump outlet conduit 65 is connected with chamber 74 by passage 87 that registers with passage 88 leading from the chamber. Passage 88 leads back to chamber 74 and two passages 89 and 90 connect passage 88 with chamber 77. Passage 91 connects pump 53 with chamber 77. Passages 92 and 93 lead from chamber 74 to passage 94 that is connected with chamber 83 and conduit 68. Passage 95 connects chamber 74 with chamber 83 and passage 91 connects pump conduit 62 with passage 96, connected with chamber 83. Chamber 74 is vented through passages 97 and 98, chamber 77 is vented through passages 99 and 100 and chamber 83 is vented through passage 101.

Valve member 75 is in the form of a sleeve and has openings 102, 103, 105 and 106 therethrough. The associated valve member 76 is formed in two diameters with the smaller diameter portion between two larger diameter portions. Valve members 82 and 73 are also formed with several reduced diameter portions around which fluid flows when aligned with any of the desired passages.

Solenoids 80 and 85 are in electric circuit means controlled by the vehicle driver and by a governor 107 responsive to the speed of the driven shaft 19, the governor being actuated by suitable mechanism (not shown) driven by gear 108. Solenoid 80 is connected with battery 109 by line 110 through ignition switch 112. Said solenoid 80 is connected to accelerator switch 124 by line 115 and then to ground through lines 123, 117, 120 and governor switch points 118 and 119.

Solenoid 85 is connected with battery 109 through line 110, ignition switch 112, line 111. Said solenoid 85 is connected to ground by lines 117, 120 and governor switch points 118 and 119. It is also possible to ground solenoid 85 by kickdown switch points 125, which are contacted by accelerator switch 124 upon full depression of accelerator pedal 127, and lines 123 and 117. Said solenoid 85 may also be grounded by operating manually operated switch 126 to close points 116 connected to line 117. Ignition switch 112 connects solenoids 80 and 85 to battery in its "on" position through lines 110, and 111 and 110, respectively.

As shown in Fig. 2, solenoids 80 and 85 are energized, placing valves 76 and 82 in their leftward positions. Switches 124 and 126 are operable by the vehicle driver, switch 124 being preferably attached to the accelerator pedal 127 as aforesaid and switch 126 being preferably mounted on the instrument board 128 forming an extension of the vehicle floor board 129.

The mechanism for shifting valve members 73 and 75 includes a U shaped actuator 130 having one arm fixed to valve 73 and the other arm fixed to a plunger 131 slidably mounted in chamber 77 and adapted to engage with one end of valve member 75. This actuator 130 is operated by lever 135' having an arm 132 extending into a slot 133 in actuator extension 134 and connected with driver operable lever 135 by link rod 136.

Lever 135' is pivoted at 140 to casing 10 and has an arm 137 through which the shank 138 of pawl 49 extends, nut 139 being secured to the end of the pawl shank extending through the arm. Spring 140 is arranged between the arm 137 and the pawl. When top end of lever 135 is pulled rearwardly by the driver, arm 132 moves rearward carrying actuator 130 therewith and arm 137 moves upwardly to engage pawl 49 with teeth 50 of the reaction gear through compression of the intermediate spring 140 whereby reverse drive The third involves the shifting of valve member 76 upon depression of accelerator pedal 127 to release both clutch 36 and brake 27 to permit the reverse gear to become effective. These three steps are initiated of course from the neutral position in which, as described above, passage 87 is blocked by valve 73 and both clutch 36 and brake 27 are vented through vent 98. In the first step lever 135 is pulled part of the way toward the rear from its neutral position, thereby causing valve actuator 130 to be moved to the right as viewed in Fig. 2 until vent 98 is blocked as well as passage 92. Passage 87 is unblocked by this movement of actuator 130 and is also connected to passage 93, the latter conducting the fluid pressure to clutch 36 and causing engagement thereof. The unblocking of passage 87 on the other side of valve 73 causes fluid under pressure to be conducted through passages 88 and 90, through port 103, around the reduced section of valve 76, through port 105, passage 96, through valve 82 and passage 66 to brake 27, thus engaging the said brake. The operation of the brake 27 and clutch 36 results in holding teeth 50 stationary for at least a brief instant. Actuator 130, however, continues to move to the right as viewed in Fig. 2 as lever 135 is made to complete its rearward movement to the reverse position. This constitutes the second step in the shift to reverse drive operation. If in this step teeth 50 should come to rest with pawl 49 engaging the top of one of said teeth, spring 140 will be compressed, thereby permitting such continued movement of actuator 130 to the right to the limiting position thereof. At the limiting position of actuator 130, pressure is still maintained in brake 27, but clutch 36 is vented through valve 73 and vent 97.

The third step is performed by the vehicle driver when he depresses accelerator pedal 127 to start the vehicle moving in reverse. This action deenergizes solenoid 80, and valve member 76 is moved to the right as viewed in Fig. 2 by spring 79 to its limiting position in that direction. In this limiting position, opening 105 in sleeve valve member 75 is in communication with the reduced diameter portion of valve member 76 which in turn is in communication with opening 106 and vent 100. The fluid pressure is blocked by sleeve valve member 75 at 89 and by valve device 76 at opening 103 in the sleeve valve member 75. Brake passage 96 is thus vented and brake 27 is released. Carrier 26 will now be driven reversely by either the primary runner 15 or the secondary runner 16 depending upon which is effective at the particular speed of the impeller 13. Reverse rotation of carrier 26 will cause sun gear 44 to be rotated reversely, and since ring gear 48 is held stationary by pawl 49, planet pinions 45 and their carrier 47 will likewise be rotated reversely, but at a reduced speed.

When the engine cannot be started and pushing of the vehicle is desired to start the engine, pump 53 serves to supply pressure fluid for engaging the brake device 27 to provide a drive connection through the gearing. With the ignition turned on, the solenoid 85 will be shifted for geared drive position, as shown in Fig. 2, so that fluid will flow from pump 53 through passages 91, 96 and conduit 66 to engage the brake device 27 thereby braking the reaction carrier. Although in a push start battery 109 may be "dead" insofar as starting the engine in concerned, it generally can supply enough current to operate solenoid 85.

It will be understood that various forms of the invention other than that described above may be used without departing from the spirit or scope of the invention.

What I claim is:

1. In a transmission for motor vehicles having an engine; a driving shaft adapted to receive drive from the engine; a driven shaft; means for driving the driven shaft from the driving shaft at a speed less than that of the driving shaft, said driving means including gears rotatable with said shafts, planet gears meshing with said gears and a carrier for the planet gears; a brake device for the carrier for causing reduced driving speed through the driving means when applied; a pressure fluid system for controlling said device; a compound valve device in the fluid system having two relatively movable members; driver operable means for one of the valve device members; electrically energized means for shifting the other valve device member into closed position when energized; means operable by the vehicle driver for controlling said electrically energized means; spring means normally urging said electrically shifted valve member into open position; and spring means normally urging said driver operated valve member into closed position.

2. In a transmission for motor vehicles having an engine; a driving shaft adapted to receive drive from the engine; a driven shaft; means for driving the driven shaft from the driving shaft at a speed less than that of the driving shaft, said driving means including gears rotating with the shafts, planet gears meshing with said gears and a carrier for the planet gears; a brake device for the carrier for causing reduced driving speed through the driving means; a clutch device connected to the gearing and operable when engaged to cause unitary rotation of the driving means; a pressure fluid system for controlling said devices; two valve devices in series in the fluid system, electrically energized means for each valve device; means operable by the vehicle driver for controlling said electrically energized means, one of said valve devices being actuated by its electrically energized means to control fluid flow to the other device and the other valve device being shiftable to selectively control flow to the brake and clutch devices.

3. In a transmission for motor vehicles having an engine controlled by an accelerator pedal, a power shaft driven by the engine, a driven shaft, planetary gearing including a carrier adapted to provide a speed reduction drive connection from the power shaft to the driven shaft, a brake device for the carrier, a pressure fluid system for engaging the brake device, a first and second valve device in series in the system, electrically energized means for each device, switch means on the accelerator pedal for rendering the electrically energized means effective when in engine idling position to close the first valve device and to deenergize the energized means when moved to accelerate the engine, means for normally urging the first valve device to closed position, speed responsive switch means for rendering the electrically energized means effective to open the second valve below a predetermined speed and to deenergize said means above the predetermined speed, and means normally urging the second valve device to closed position.

4. In a transmission for motor vehicles having is established. When the upper end of lever 135 is moved forwardly actuator 130 is moved forwardly and arm 137 bearing against nut 139 will disengage the pawl from teeth 50 of the reaction gear to disconnect the reverse drive.

As previously mentioned, engagement of brake device 27 effects forward drive through either one of the gear trains and is referred to as geared drive. When the clutch device 36 is engaged forward direct drive is effected. The brake device and the clutch device are both disengaged to establish reverse drive.

Pump 52 is driven by the engine and will not move fluid through the control system until it is started and running. Pump 53 will move fluid through the system only when the vehicle is moving. Thus while the engine is not operating and standing still fluid in the system will not be under pressure so the brake and clutch devices will be disengaged. Assuming the actuator 130 is in neutral position, i. e., a position substantially midway between the forward and reverse limits of movement of actuator 130, the clutch device 36 is vented through conduit 68, passages 94, 92, 95 and 101 or vent 98 while the brake device 27 is vented through conduit 66 and passage 101, valve 82 being to the right from its position in Fig. 2 to permit this, since solenoid 85 is not energized.

The next step in conditioning the transmission for drive is to close the ignition switch 112 so that the engine may be started. This will complete the electrical circuits to solenoids 80 and 85 so that they will be energized and will shift valve member 76 and valve 82 to the positions shown in Fig. 2. The circuit for solenoid 80 consists of battery 109, line 110, switch 112, line 115, contact 114, switch 124 and lines 123, 117, 120 and governor grounding switch contacts 119 and 118. The circuit for solenoid 85 consists of battery 109, line 110, switch 112, lines 111, 117 and 120, contact 119 and governor operated switch 118 that is closed below some predetermined vehicle speed and opened above such speed. Valve 73 is closed when actuator 130 is in neutral position as shown in Fig. 2 so conditioning of valve members 76 and 82 will not effect fluid flow.

The next step in establishing forward geared drive through the transmission with the engine idling is to shift actuator 130 to the left, as viewed in Fig. 2, thereby opening passage 87 to passage 89 and this is accomplished by the driver moving the upper portion of lever 135 forwardly. This shift of the actuator carries member 131 therewith and shifts valve member 75 to the left conditioning it to allow subsequent flow from passage 89 to passage 96 through passages 102 and 106 but such present flow is blocked by valve member 76. As valve 82 permits flow from passage 96 to conduit 66 the brake device 27 will be applied to the carrier to establish geared drive upon release of valve 76 by solenoid 80 and this is accomplished by pressing the accelerator pedal down breaking the solenoid circuit. Spring 79 will now move valve 76 to the right of the position shown in Fig. 2 so that the small diameter portion overlies passages 106 and 102 in open valve member 75. Fluid will now flow to the brake device through the two flow control devices 70 and 71 and the selector device 72. Valve 82 shuts off fluid flow from passage 96 to passage 94 so the clutch device is disengaged. The transmission is now in geared drive because the carrier 26 is held stationary by brake device and either one of the two gear trains will be effective depending upon the speed of the fluid coupling. In starting up, the low speed gear train will first be effective and at some advanced speed the second runner 16 of the fluid coupling will become effective to drive the intermediate speed gear train.

Geared drive is maintained with the control means in the last described positions until governed speed is reached whereupon switch 118 is moved away from contact 119 by the governor to thus break the circuit for solenoid 85. When the circuit is broken to solenoid 85, spring 84 will move valve member 82 to the right of the position shown in Fig. 2 shutting off conduit 66 leading to the brake device 27 and opening up passage 96 to passage 94 so that fluid will flow through conduit 68 into chamber 69 to engage the clutch device 36. Conduit 66 for the brake device is now open to vent passage 101. The engagement of the clutch device will cause the driving means to rotate as a unit and thereby effect rotation of the driven shaft at the same speed as that of the driving shaft. The clutch device will be automatically engaged by the fluid pressure system at any speed above the governed speed and when vehicle speed falls below governed speed then the governor will reestablish the circuit to the solenoid 85 through switch 118 to thereby place the control means back into the geared drive relation previously described.

There are two means by which geared drive may be manually effected while the vehicle is above the governed speed.

By pressing the accelerator pedal 127 beyond wide open throttle position, that is, into a relation known as overtravel position, switch 124 will be engaged with grounded contact 125 to establish a circuit for solenoid 85 through line 123 even though the governor controlled circuit is open. Overtravel control is sometimes known as kickdown and when effective the circuit for solenoid 85 will consist of battery 109, line 110, switch 112, lines 111, 117 and 123, switch 124 and grounded contact 125. When the kickdown circuit is established valve 82 is moved back to geared drive position as shown in Fig. 2 and it will remain in this position until the kickdown circuit is broken above the governed speed whereupon solenoid 85 will be deenergized and valve 82 will be moved by spring 84 back to direct drive position.

The other manually controlled means provides for energizing solenoid 85 to place valve 82 into geared drive position whenever switch 126 is moved to engage contact 116 at the will of the driver. This circuit for the solenoid consists of battery 109, line 110, switch 112, lines 111 and 117, contact 116 and grounded switch 126. So long as this circuit is maintained valve member 82 will be held in geared drive relation whereby the brake device 27 is engaged and the clutch device 36 disengaged at any vehicle speed. In other words this manually controlled circuit provides a permanent geared drive as long as the driver desires and the circuit can be established at will to overrule the governor circuit above the governed speed.

For reverse drive of shaft 19 three steps must be taken, the first of which is to synchronize pawl 49 with teeth 50, the second taking place when the accelerator pedal 127 is in the engine idling position with one of the valves set for reverse drive and the shift of the pawl into engagement with the teeth 50 has been completed an engine controlled by an accelerator pedal, said transmission being adapted to provide forward and reverse drives, a power shaft driven by the engine, a driven shaft, planetary gearing including a carrier adapted to provide a speed reduction drive connection from the power shaft to the driven shaft, a brake device for the carrier, a pressure fluid system for engaging the brake device, first and second valve devices in series in the fluid system, electrically energized actuator means for closing the first valve device, means for opening the first valve device when the actuator means is deenergized, a switch movable with the accelerator pedal effective in engine idling position to energize the actuator means, manually operable means for controlling the shift between forward and reverse drives, spring means for opening the second valve device and means operably connected to the manually operable means for closing the second valve device.

5. In a transmission for motor vehicles having an engine controlled by an accelerator pedal, a driving shaft adapted to receive drive from the engine, a driven shaft, planetary gearing including a carrier adapted to provide a reduced drive connection from the power shaft to the driven shaft when the carrier is held stationary, a clutch device connected to the gearing and operative when engaged to cause unitary rotation of the gearing, a pressure fluid system for selectively controlling said brake and clutch devices, a first flow control valve device and a second flow selector valve device in series in the system, electrically energized means under control of the accelerator pedal for controlling the first valve device, electrically energized means for controlling the second valve device to direct fluid flow to either the brake device or the clutch device, vehicle speed responsive means controlling said energized means for the selector valve device, said speed responsive means effecting shifting of the valve device to direct fluid flow to the brake below a predetermined speed, and spring means normally urging said valve device into position directing flow to the clutch device.

6. In a transmission for motor vehicles having an engine controlled by an accelerator pedal, a driving shaft adapted to receive drive from the engine, a driven shaft, planetary gearing including a carrier adapted to provide a reduced drive connection from the power shaft to the driven shaft when the carrier is held stationary, a brake device for the carrier, a clutch device connected to the gearing and operative when engaged to cause unitary rotation of the gearing, a pressure fluid system for selectively controlling said brake and clutch devices, a flow control valve device in the system, a selector valve device in the system in series with the control valve device for directing fluid flow to either the brake device or clutch device, solenoids for actuating the valve devices, associated electric circuits for the solenoids, a switch in the circuit for the control valve device solenoid, said switch being operative by the accelerator pedal to energize the circuit and close the control valve device when the pedal is in engine idling position and to open the circuit when the pedal is in engine accelerating position, a governor controlled circuit connected with the selector valve device solenoid adapted to be closed below a predetermined speed to direct flow to the brake device, said governor circuit being open above the predetermined speed, means normally positioning the selector valve device to direct fluid to the clutch device, and means operable at will by the vehicle driver effective to close the circuit for the selector valve device solenoid.

7. In a transmission for motor vehicles having an engine controlled by an accelerator pedal, a driving shaft adapted to receive drive from the engine, a driven shaft, planetary gearing including a carrier adapted to provide a reduced drive connection from the power shaft to the driven shaft when the carrier is braked, a brake device for the carrier, a clutch device connected to the gearing and operative to cause unitary rotation of the gearing, a pressure fluid system for selectively controlling the brake and clutch devices, a flow control valve device in the system, a selector valve device in the system for directing flow to the brake device or the clutch device, said selector valve device being in series with the control valve device, solenoids for controlling said valve devices, electric circuit means for the solenoids, a switch carried by the accelerator pedal for completing the circuit to the control valve device solenoid to close the valve device when the pedal is in engine idling position and completing the circuit to the selector valve device solenoid when the pedal is in overtravel position, a speed responsive switch in the circuit for the selector valve device solenoid effective to energize the solenoid and direct fluid flow to the brake device below a predetermined vehicle speed, and means for positioning the selector valve device to direct flow to the clutch device when the solenoid is deenergized.

8. In a transmission for motor vehicles having an engine controlled by an accelerator pedal, a driving shaft adapted to receive drive from the engine, a driven shaft, planetary gearing including a carrier adapted to provide a reduced drive connection from the power shaft to the driven shaft when the carrier is braked, a brake device for the carrier, a clutch device connected to the gearing and operative to cause unitary rotation of the gearing, a pressure fluid system for selectively controlling the brake and clutch devices, a flow control valve device in the system, a selector valve device in the system for directing fluid flow from the control device to either the brake device or the clutch device, said valve devices being arranged in series, solenoids for controlling the valve devices, electric circuit means including a switch movable with the accelerator pedal for completing the circuit to one of said solenoids when the pedal is in engine idling position to condition the control device for flow shut off and to open the circuit when moved to engine accelerating position, resilient means for opening the valve device when the circuit is open, electric circuit means for the clutch device solenoid including a switch responsive to vehicle speed below some predetermined value to energize the solenoid and move the selector switch to allow fluid flow to the brake device, the selector valve device moving to allow fluid flow to the clutch device when the associated solenoid is deenergized above the predetermined vehicle speed, and driver controlled means for energizing the solenoid for the selector valve device and overruling the speed controlled switch while the accelerator pedal is in any operating position in its range of movement.

9. In a transmission for motor vehicles driven by an engine controlled by an accelerator pedal, a power shaft driven by the engine, a driven shaft, gearing adapted to establish two driving ratios from the power shaft to the driven shaft, two devices operable to control the driving ratio of the gearing, a pressure fluid system connected with the control devices, three valve devices in series in the system, manual means for shifting the first valve device in the series to control fluid flow, the second valve device controlling fluid flow and comprising two members one of which is controlled by the manual means, electrically energized means controlling the other member of the second valve device and responsive to the accelerator pedal position to open the member only when the engine is accelerated, electrically energized means for operating the third valve device for directing fluid flow in the system to a selected ratio control device, and means responsive to vehicle speed for controlling the electrically energized means for the third valve device.

10. In a transmission for motor vehicles driven by an engine, a power shaft driven by the engine, a driven shaft, gearing adapted to establish two driving ratios from the power shaft to the driven shaft, two devices selectively operable to control the driving ratio of the gearing, a pressure fluid system connected with the control devices, a selector valve device in the system shiftable to direct the fluid flow in the system to either device, spring means urging the valve device into position directing fluid flow to the higher speed control device, a solenoid for shifting the valve device into position directing fluid flow to the lower speed control device, electric circuit means connected with the solenoid, a pair of switches in the circuit means arranged in parallel, means responsive to vehicle speed for operating one of the switches to close the circuit below a predetermined speed value, and driver operated means for actuating the other switch at will.

11. In a transmission for motor vehicles driven by an engine controlled by an accelerator pedal, a power shaft driven by the engine, a driven shaft, gearing adapted to establish two driving ratios from the power shaft to the driven shaft, two devices selectively operable to control the driving ratio of the gearing, a pressure fluid system connected with the devices, a selector valve in the system shiftable to direct fluid flow in the system to either one of the control devices, spring means urging said valve into position directing fluid flow to the high speed control device, electrically energized means for shifting the valve to position directing fluid flow to the low speed control device, means responsive to vehicle speed in a low value range for actuating the electrically energized means, and means operable by overtravel of the accelerator pedal for activating the electrically energized means.

12. In a transmission for motor vehicles having an engine, an engine driven power shaft, a driven shaft, gearing adapted to effect a two-speed driving connection between the shafts, a pair of control devices for the gearing alternately operable to select between the two driving speeds, a pressure fluid system, a primarly flow control valve in the system, a compound flow control valve device in the system in series with the primary flow control valve, an actuator for shifting the primary valve to open position and shifting a member of the compound valve device to open flow position, means under control of the vehicle driver for shifting another member of the compound valve device at will, and a selector valve device in the system operable to direct flow to either of the gearing control devices.

13. In a transmission for motor vehicles having an engine controlled by an accelerator pedal, an engine driven power shaft, a driven shaft, gearing adapted to effect a two speed drive connection from the power shaft to the driven shaft, a pair of control devices for the gearing alternately operable to select between the driving speeds, a pressure fluid system, a primary flow control valve, a compound secondary flow control valve device having relatively movable members, an actuator for shifting the valve and one of the members of the compound valve device similarly to open position, electrically energized means for shifting the other member of the valve device to closed position, spring means moving the one member of the valve device to closed position and the other member to open position, a switch movable with the accelerator pedal for conditioning the energized means to close the associated valve member when in engine idling position, and means in the system selectively directing fluid to either of the gearing control devices.

14. In a transmission for motor vehicles having an engine; a driving shaft adapted to receive drive from the engine; a driven shaft; means for driving the driven shaft from the driving shaft at a speed less than that of the driving shaft, said driving means including gears rotating with said shafts, planet gears meshing with said gears and a carrier for the planet gears; a brake device for the carrier effecting reduced driving speed through the driving means when applied; a clutch device connected with a portion of the said gears and operable when engaged to effect unitary rotation of the driving means; a pressure fluid system for controlling said devices; a valve device in the fluid system having a shiftable valve member; a compound valve device in the fluid system composed of two relatively movable valve members in series with the shiftable valve member; driver operable means for controlling the shiftable valve member and one of the members of the compound valve device; electrically energized means for controlling the other valve member of the compound valve device; and means operable by the driver for controlling said electrically energized means, said valve members being adjustable to control fluid flow in the system.

15. In a transmission for motor vehicle having an engine controlled by an accelerator pedal, a power shaft driven by the engine, a driven shaft, planetary gearing adapted to provide a drive connection between said shafts, a brake device adapted to engage a portion of the gearing and provide reaction means, a pressure fluid system for engaging the brake device, three valve devices in series in the system, driver operated means for shifting the first valve device, electric means for opening the second valve device, electric means for opening the third valve device, the electric means for the second valve means being controlled by the accelerator pedal, and a governor controlling the electric means for the third valve device.

16. In a transmission for motor vehicles having an engine, a power shaft driven by the engine, a driven shaft, planetary gearing including a carrier adapted to provide a drive connection between said shafts, a brake device for the carrier, a pressure fluid system leading to the brake device, three valve devices in series in the system, manually operable means controlling the first valve device in the series, solenoids controlling the second and third devices, electric circuit means for the solenoids, driver operated means controlling the circuit to the second valve device, and vehicle speed responsive means controlling the third valve device.

17. In a transmission for motor vehicles having an engine; a driving shaft adapted to receive drive from the engine; a driven shaft; means for driving the driven shaft from the driving shaft at a speed less than that of the driving shaft, said driving means including a gear on the driving shaft, a gear on the driven shaft, planet gears meshing with said gears and a carrier for the planet gears; a brake device for the carrier for causing reduced driving speed through the driving means; a clutch device connected with a portion of the said gears and operable when engaged to cause unitary rotation of the driving means; a pressure fluid system for controlling said devices; a valve in the system movable into two positions for selectively controlling fluid flow to the devices; electrically energized means for moving said valve into one position to cause engagement of said brake device; spring means for moving said valve into another position to cause engagement of said clutch device; and manually operable switch means connected to the electrically energized means and adapted to control the electrically energized means to cause engagement of the brake device and release of the clutch device.

18. In a transmission, a power shaft, a driven shaft, planetary gearing including a reaction member adapted to establish forward drive when the member is braked, a brake device for the reaction member, gearing between the reaction member and the driven shaft adapted to establish reverse drive, said reverse gearing including a reaction gear, a shiftable pawl for engaging the reaction gear to establish reverse drive, a pressure fluid system for applying the brake device, valve means in the system, an actuator for shifting both the pawl and the valve means to a reverse drive position, said valve means in such actuator shifted position effecting disengagement of the forward drive clutch and engagement of the forward drive brake, and additional operator-controlled means for effecting disengagement of the forward drive brake.

19. In a transmission for motor vehicles driven by an engine controlled by an accelerator pedal, a power shaft driven by the engine, a driven shaft, planetary gearing including a carrier adapted to establish forward drive when the carrier is braked, a brake device for the carrier, gearing driven by the carrier including a reaction gear, said gearing being adapted to drive the driven shaft reversely when the reaction gear is braked, brake means for the reaction gear, a pressure fluid system connected with the brake device, a flow control valve in the system shiftable into two positions to allow flow and shutting off fluid flow in an intermediate position, a compound valve device in the system in series with the control valve, said compound valve having two members movable into two open positions, spring means moving one valve member into one open position and the other member into closed position, electrically energized means adapted to move the second valve member into closed position when the accelerator pedal is in idling position and to release the second valve member when the accelerator pedal is in engine accelerating position, an actuator fixed to the control valve and adapted to control the brake means for the reaction gear, said actuator shifting the second valve member to open position when shifted for forward drive, and driver operable means for operating the actuator.

20. In a transmission for motor vehicles driven by an engine, a power shaft driven by the engine, a driven shaft, planetary gearing including a reaction carrier geared to said shafts and adapted to provide forward drive when the carrier is braked, a brake device for the carrier, gearing connecting the carrier with the driven shaft and including a reaction gear, said gearing being adapted to establish reverse drive when said reaction gear is braked and the carrier is released, brake means for the reaction gear, control means for the brake device, and control means for the brake means, said brake device and brake means being engageable at the same time to prevent drive between the shafts.

21. In a transmission for motor vehicles driven by an engine controlled by an accelerator pedal, a power shaft driven by the engine, planetary gearing including a reaction carrier geared to said shafts, a brake device for the carrier, gearing connecting the carrier and the driven shaft including a reaction gear, brake means for the gear, a pressure fluid system for controlling the brake device, a valve device in the system conditioned by the accelerator pedal to close when the engine is idling in forward drive and to close when the engine is idling in reverse, and a driver operated actuator for controlling the brake means and the valve device, said actuator assisting in the control of the valve device whereby the valve device is open to apply the carrier brake device when the reaction gear is braked with the engine idling, said brake device being closed when the engine is accelerated.

22. In a transmission for motor vehicles driven by an engine controlled by an accelerator pedal, a power shaft driven by the engine, a driven shaft, planetary gearing including a reaction carrier connecting the shafts, a brake device for the carrier, a clutch device connected to the planetary gearing and engageable to cause unitary rotation of the planetary gearing, gearing connecting the carrier with the driven shaft including a reaction gear adapted to be braked to establish reverse drive when the brake device and the clutch device are released, brake means for the reaction gear, and control means operable in conjunction with the accelerator pedal to selectively engage either the brake device or the clutch device, or to engage both the brake device and the brake means, or the brake means only.

23. In a transmission for motor vehicles driven by an engine controlled by an accelerator pedal, a power shaft driven by the engine, a driven shaft, planetary gearing including a carrier adapted to establish forward drive when the carrier is braked, a brake device for the carrier, gearing including a reaction gear adapted to establish reverse drive when the carrier is released and the reaction gear is braked, brake means for the reaction gear, a pressure fluid system for controlling the brake device, two valve devices in series in the system, an actuator for shifting the first valve device, the reaction gear brake means and a portion of the second valve device, electrically energized means for shifting another part of the second valve device adapted to be controlled by the accelerator pedal to shut off fluid flow during idling of the engine and to allow fluid flow when the engine is accelerated, said actuator operated valve device portion being shifted to open position when the actuator is in forward drive position, and driver controlled means for shifting this actuator.

24. In a transmission, a driving shaft; a driven shaft; gearing connecting said shafts for establishing forward drive; gearing connecting said forward drive gearing with said driven shaft for reverse drive, said gearings each having a reaction member and said forward drive gearing having a clutch to establish direct drive; brake devices for said reaction members, a fluid system including a valve device for controlling the forward drive reaction member and clutch; and a manually operable actuator for shifting the valve and the reverse brake device between neutral and reverse drive positions, said actuator having an intermediate position in which both the brake and clutch of the forward drive gearing are engaged and another position in which the brakes of the forward drive gearing and reverse drive gearing are engaged and the forward drive gearing clutch is disengaged.

25. In a transmission, a power shaft for an engine, a driven shaft, planetary gearing including a reaction member adapted to establish forward drive when the member is braked and a clutch to establish direct drive, a brake device for the reaction member, gearing between the reaction member and the driven shaft adapted to establish reverse drive, said reverse drive gearing including a reaction gear, a shiftable pawl for engaging the reaction gear to establish reverse drive, a pressure fluid system for applying the brake device, compound valve means in the system, said compound valve means including two relatively movable parts, an actuator for shifting both the pawl and a part of the compound valve means to a reverse drive position, said valve means in such actuator shifted position effecting disengagement of the forward drive clutch and engagement of the forward drive brake; solenoid means for operating the other part of the valve means to disengage said forward drive brake, and manually controlled switch means for controlling operation of the solenoid.

26. A transmission as described in claim 25, an accelerator pedal for the engine, said manually controlled switch being operated by said accelerator pedal.

FOREST R. McFARLAND.

REFERENCES CITED

The following references are of record in the file of this patent:

UNITED STATES PATENTS

| Number | Name | Date |
|---|---|---|
| 2,171,534 | Banker | Sept. 5, 1939 |
| 2,332,593 | Nutt | Oct. 26, 1943 |
| 2,368,684 | Simpson | Feb. 6, 1945 |
| 2,373,234 | Duffield | Apr. 10, 1945 |
| 2,407,289 | La Brie | Sept. 14, 1946 |